United States Patent [19]
Xie

[11] Patent Number: 5,905,748
[45] Date of Patent: May 18, 1999

[54] SINGLE MODE LASER AND METHOD SUITABLE FOR USE IN FREQUENCY MULTIPLIED

[75] Inventor: Ping Xie, San Jose, Calif.

[73] Assignee: Uniphase Corporation, San Jose, Calif.

[21] Appl. No.: 08/861,372

[22] Filed: May 27, 1997

[51] Int. Cl.$^6$ ........................................................ H01S 3/10
[52] U.S. Cl. .............................. 372/22; 372/19; 372/23; 372/32; 372/105; 372/106
[58] Field of Search ........................................... 372/9, 19, 20, 372/23, 27, 32, 22, 92, 105, 106

[56] References Cited

U.S. PATENT DOCUMENTS

| | | | |
|---|---|---|---|
| 4,682,340 | 7/1987 | Dave et al. | 372/108 |
| 4,914,664 | 4/1990 | Woodward | 372/20 |
| 5,038,360 | 8/1991 | Negus et al. | 372/105 |
| 5,052,815 | 10/1991 | Nightingale et al. | 372/94 |
| 5,164,947 | 11/1992 | Lukas et al. | 372/22 |
| 5,206,867 | 4/1993 | Esterowitz et al. | 372/20 |
| 5,381,421 | 1/1995 | Wedekind et al. | 372/19 |
| 5,381,427 | 1/1995 | Wedekind et al. | 372/19 |
| 5,430,754 | 7/1995 | Suzuki et al. | 372/92 |
| 5,497,387 | 3/1996 | Okazaki | 372/21 |

OTHER PUBLICATIONS

N. MacKinnon and B. D. Sinclair; "A laser diode array pumped, Nd:YVO4/KTP, composite material microchip laser"; Optics Communications 105, 1994.

J. M. Yarborough, et al., "Enhancement of optical second harmonic generation by utilizing the dispersion of air"; Feb. 1971; Applied Physics Letters, vol. 18, No. 3.

T. Baer; "Large amplitude fluctuations due to longitudinal mode coupling in diode–pumped intracavity–doubled Nd:YAG lasers"; Sep. 1986; Journal of Optical Society of America, vol. 3, No. 9.

*Primary Examiner*—Brian Healy
*Attorney, Agent, or Firm*—Mike Pritzkau; Steve Shear

[57] ABSTRACT

A single mode laser implementation and associated method are disclosed. The laser may accommodate a frequency multiplying material to provide an intracavity doubled single frequency laser. The laser implementation includes an input mirror and an output mirror defining a resonant cavity and a light path within the resonant cavity and between the mirrors. A lasant material is positioned in the light path for lasing at a desired fundamental wavelength and possibly other, unwanted wavelengths. A first birefringent member is also positioned in the light path for refracting in different directions the different wavelengths of light which are present along the path. Also positioned in the light path is a second birefringent member which cooperates with the first birefringent member such that the first and second birefringent members together discriminate between the desired fundamental wavelength and the unwanted wavelengths so that one polarization of the desired fundamental wavelength is refracted in one direction which causes it to lase while certain portions of the unwanted wavelengths are refracted in other directions which cause all polarizations of the unwanted wavelengths to be extinguished.

36 Claims, 3 Drawing Sheets

SINGLE MODE LASER AND METHOD SUITABLE FOR USE IN FREQUENCY MULTIPLIED

BACKGROUND OF THE INVENTION

The present invention relates generally to single mode lasers and more particularly to a single mode laser implementation which may accommodate a frequency multiplying material to provide an intracavity doubled single frequency laser.

In the prior art, a variety of single longitudinal mode (hereinafter SLM) lasers have been developed. One particular reason for the interest in SLM lasers resides in the ease with which an SLM laser can be converted to a frequency doubled configuration through the addition of a non-linear material within the laser cavity. In addition, certain problems have been encountered when attempts have been made to convert types of laser other than SLM lasers to the intracavity doubled frequency configuration, as will be seen immediately hereinafter.

The non-linear frequency doubling technique of the prior art has often been used to produce coherent radiation in the visible and ultraviolet spectral region. Acceptable optical conversion efficiency has been achieved in this manner. However, many of these frequency doubled lasers suffer a so called "green noise" problem which limits their usefulness in a number of applications. More specifically, the green noise problem introduces amplitude noise (i.e. variation in the intensity of the output beam at the doubled frequency) which is believed to due to gain competition introduced by the presence of additional modes other than one longitudinal fundamental mode in the laser's resonant cavity in combination with the phenomenon of longitudinal mode coupling through a nonlinear doubling process between the various modes which are present. One popular approach to solving the "green noise" problem is to eliminate the additional modes in the laser light (i.e., use an SLM laser) which excites the non-linear material and thereby eliminate longitudinal mode coupling so as to obtain a single doubled output frequency.

A variety of intracavity doubled single longitudinal mode (SLM) laser systems have been developed in the prior art. One approach in achieving SLM operation is through the use of a ring laser geometry. In a ring laser geometry, spatial holeburning is eliminated by a unidirectional traveling wave. SLM operation is thus achieved in a homogeneous broadened laser system. One example of an intracavity doubled SLM laser is disclosed in U.S. Pat. No. 5,052,815, issued Oct. 1, 1991 to Nightingale et al. One of the principal drawbacks in using a ring laser geometry is that it is difficult to align and operate. Also, a ring laser is generally more complicated than a simple linear cavity because of the optical diode and reciprocal retardation compensator used. Further, beam pointing stability of a ring laser is usually not as good as that obtained using a linear cavity. Nevertheless, a ring laser is generally believed to be more efficient than a standing wave linear cavity since the traveling wave extracts all the available gain uniformly. However, in an intracavity doubled laser, a ring laser is not necessarily more efficient than a linear cavity simply because more intracavity elements are required in a ring cavity for unidirectional operation. These additional elements yield more intracavity losses in the doubled frequency ring geometry as compared with those in a doubled frequency linear geometry since intracavity doubled laser systems are extremely sensitive to cavity losses. Obviously, more losses result in less doubled power.

Another technique for producing an SLM laser is disclosed by Lukas et al in U.S. Pat. No. 5,164,947, issued on Nov. 17, 1992. In this patent disclosure, a twisted-mode technique is employed to eliminate spatial holeburning so as to obtain SLM operation. The laser cavity comprises an input mirror and an output coupler which define a linear laser cavity. Inside the laser cavity, a lasant rod is inserted between two quarter-wave plates. A polarizer and a nonlinear optical crystal are also included in the laser cavity to define the polarization direction of the fundamental wave and to generate output radiation at twice the frequency of the fundamental wave. The laser mode is circularly polarized in the laser rod, resulting in a standing wave in which the electric field vector rotates through the gain medium and in which there are no standing wave nodes within the gain medium. Spatial holeburning is thus eliminated. However, this approach has its own limitations and is often difficult to implement. First, it relies on having two precise quarter-wave plates inside the cavity. Second, the laser rod has to be non-birefrigent. This requirement restricts the laser to a limited number of laser hosts. Further, as the laser crystal is optically excited, the thermally and stress induced birefringence will introduce spatial holeburning in the gain medium, again resulting in multiple mode operation. From the standpoint of implementation, the complexities of this laser design make it difficult to scale and operate.

A recent patent disclosure, U.S. Pat. No. 5,381,421, issued to Wedekind et al. on Jan. 10, 1995, describes another way to achieve SLM laser operation in a linear laser cavity. In this approach, a Brewster polarizer and a birefrigent material form a Lyot filter which narrows the frequency bandwidth for single longitudinal mode operation. The major inconvenience of this approach resides in its use of a Brewster polarizer. As we know, the Brewster angle is usually greater than 45 degrees and, thus, is not convenient to work with. Also, a Brewster polarizer is not a perfect polarizer in that it only has about a 16% loss for the polarization which is discriminated against. For this reason the Brewster polarizer may not provide loss at levels sufficient to suppress longitudinal modes other than the fundamental. Further, any slight deviation from the Brewster angle will introduce additional insertion loss which may harm frequency doubling and selection. Similarly, another patent disclosure U.S. Pat. No. 5,430,754, issued to Suzuki et al. on Jul. 4, 1995 discloses a Lyot filter formed by an off-axially cut Nd:YVO$_4$ and a birefrigent material such as KTP to generate SLM radiation. The limitation of this approach is its reliance on strong birefringence and long crystal length to enhance the Poynting vector walkoff. Also, in the case of Nd:YVO$_4$, which is the preferred mode of operation, the Nd:YVO$_4$ is cut 43 deg off of the cleavage plane. The fabrication of such an off-axially cut crystal is not trivial and, typically, is accompanied by a low yield. Moreover, in both of these Lyot filter approaches, a plurality of intracavity elements have surfaces substantially normal to the cavity axis. Residual reflections from these surfaces can lead to intracavity etalon and coupled cavity effects resulting in mode-hopping.

The present invention provides a heretofore unseen approach and associated method for producing an SLM laser which eliminates the problems described above and which is suitable for use in intracavity frequency doubled applications.

SUMMARY OF THE INVENTION

As will be described in more detail hereinafter, there is disclosed herein a single mode laser implementation which may accommodate a frequency doubling material to provide an intracavity doubled single frequency. An associated method is also disclosed. The laser implementation includes an input mirror and an output mirror defining a resonant cavity and a light path within the resonant cavity and between the mirrors. A lasant material is positioned in the light path for lasing at a desired fundamental wavelength and possibly other, unwanted wavelengths. A first birefringent means is also positioned in the light path for refracting in different directions the different wavelengths of light which are present along the path. Also positioned in the light path is a second birefringent means which cooperates with the first birefringent means such that the first and second birefringent means together discriminate between the desired fundamental wavelength and the unwanted wavelengths so that the desired fundamental wavelength is refracted in one direction which causes it to lase while the unwanted wavelengths are refracted in other directions which cause them to be extinguished.

In accordance with the method of the present invention, light which is produced by a lasant material or other such suitable light source passes through a specifically configured birefringent means such that the polarization of a component of the light at a desired, single wavelength is affected in a predetermined way and so that the polarization of certain components of the light at other wavelengths are affected in other ways. Thereafter, the light is refracted such that these certain other components of light are refracted at angles which cause the other wavelengths to be rejected and so that the single wavelength is refracted at an angle which causes the single wavelength to retrace itself and thereby lase within the laser's cavity.

In one aspect of the invention, the laser can output a single longitudinal mode of light.

In another aspect of the invention, a non-linear material may be exposed to a single fundamental light mode within the laser such that a particular harmonic of the fundamental is generated and output from the laser.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
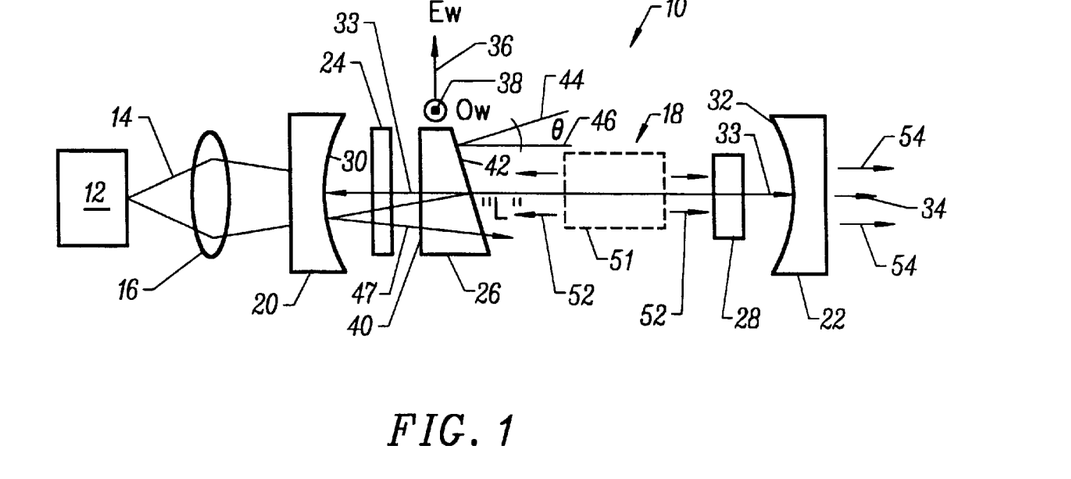
FIG. 1 is a diagrammatic view of a laser manufactured in accordance with the present invention which may be configured for operating as an SLM laser or for outputting harmonically multiplied frequencies through the addition of a non-linear material.

Turning to the drawings, wherein like components are designated by like reference numerals throughout the various figures, attention is initially directed to FIG. 1 which illustrates one embodiment of a laser manufactured in accordance with the present invention and generally indicated by the reference numeral 10. Laser 10 includes a pumping light source 12 which emits light 14 at a predetermined wavelength. Light 14 passes through a lens 16 and, thereafter, into a resonant cavity 18 that is defined between an input mirror 20 and an output mirror 22. In accordance with the present invention, a lasant material 24, a birefringent wedge 26 and a birefringent crystal 28 are positioned within cavity 18, as will be described in further detail at appropriate points hereinafter.

Continuing to refer to FIG. 1, a face 30 of input mirror 20 is coated in a known manner to be highly transmissive to light 14 while, at the same time, being highly reflective to a fundamental lasing wavelength (i.e., the light emitted by lasant material 24). A face 32 of output mirror 22 is also coated such that a lasing light path 33 is defined between the two mirrors based upon the intended application of laser 10. For example, if the laser is used as an SLM laser, a partially reflective coating is applied to face 32 of the output mirror such that a relatively small percentage of light (indicated as an arrow 34) at the fundamental lasing wavelength which is incident upon the output mirror passes therethrough.

As another example, if laser 10 is intended to produce an output wavelength which requires a frequency multiplying configuration (through a modification to be described below), face 32 of the output mirror is coated so as to be highly reflective to the fundamental lasing wavelength and highly transmissive to a desired harmonic, for example, the second harmonic of the fundamental wavelength, as will be described at an appropriate point below. Although Nd:YVO$_4$ is the preferred lasant material, other lasant materials may also be used. These other materials include, but are not limited to, Nd:YAG, Nd:YLF, Nd:SFAP, Nd:YALO$_3$, Cr:LiSrF$_4$, Cr:LiCaF$_4$, Cr:BeAlO$_3$ and Cr:LiSrF$_4$. Therefore, the fundamental wavelength and second harmonic wavelength can vary depending upon the specific lasant host and cooperating coatings on faces 30 and 32. For purposes of simplicity, the remaining discussions will consider the use of Nd:YVO$_4$ with a fundamental wavelength of 1064 nm and second harmonic wavelength of 532 nm. However, with the application of the principles described below, the use of lasant materials other than Nd:YVO$_4$ will be clear to those of skill in the art in view of this overall disclosure.

Still referring to FIG. 1, pumping light source 12 is arranged such that pumping light beam 14 emitted from source 12 is optically coupled to and directed through input mirror 16 into lasant material 24. Pumping light source 12 may be provided in a wide variety of different forms so long as it produces or emits light beam 14 at a predetermined wavelength that is keyed to the lasant material, as is well known. Pumping beam 14, when directed into lasant material 24, is absorbed by the lasant material and causes the material to lase thereby injecting a predetermined fundamental wave as well as unwanted wavelengths into cavity 18. In one embodiment, pumping light source 12 is a laser diode which emits light at a wavelength at or about 809 nm. As is known in the art, laser diodes of this type are readily available.

In accordance with the present invention, birefringent wedge 26 and birefringent member 28 may be formed from birefringent materials such as, for example, calcite, orthovanadate, quartz or any other suitable such material. As is known in the art, birefringent materials include an ordinary axis and an extraordinary axis. In FIG. 1, the extraordinary axis of wedge 26 is indicated along the direction of an arrow 36 as $E_W$ while the ordinary axis, $O_W$, of wedge 26 is oriented in a direction which is perpendicular to the plane of the figure, as indicated at reference numeral 38 by a symbol denoting an arrow which is perpendicular to the plane of the figure. It is noted that the positive and negative directions along each of the $O_W$ and $E_W$ axes is not critical in accordance with the teachings herein. In addition, wedge 26 includes one surface 40 which resides in the plane of $O_W$ and $E_W$ and which is generally normal to light path 33. Generally opposing surface 40 is a wedge plane surface 42. For descriptive purposes, a line 44 is shown as normal to wedge plane 42. Another line 46 is shown normal to the plane defined by $O_W$ and $E_W$ such that an angle θ is formed between the two lines.

Figure 2:
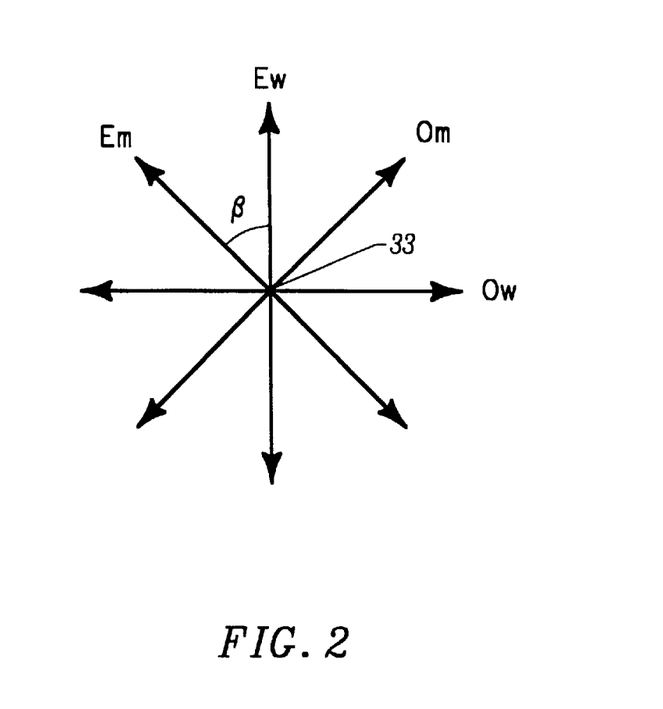
FIG. 2 is a diagrammatic representation looking in a direction along the light path of the laser of FIG. 1 from its lasant material towards its output mirror illustrating a relationship between the ordinary and extraordinary axes of a birefringent lasant wedge member and a birefringent non-linear member which form part of the laser of in accordance with the present invention.

Referring now to FIG. 2 in conjunction with FIG. 1, birefrigent crystalline member 28 is placed along light path 33 with its extraordinary axis, $E_M$ oriented at an angle β which is preferred to be 45 degrees with respect to $E_W$. Additionally, the plane defined by $O_M$ and $E_M$ is generally normal to light path 33. It should be noted with regard to FIG. 2 that the various axes are illustrated with respect to the length of light path 33 as if looking from lasant material 20 towards output mirror 22. Light path 33 is assumed to be straight in FIG. 2 for purposes of clarity. However, one of skill in the art will recognize that light path 33 is, in fact, not straight (see FIG. 1) as a result of passing through the various components along its length. Moreover, as mentioned previously, the positive and negative directions along these axes are not critical and, therefore, are not illustrated in FIG. 2. While a β of 45° is preferred, other angles may be found to be suitable as will be described in further detail at an appropriate point below. The configuration of wedge 26 in conjunction with the overall relationship between wedge 26 and birefringent member 28 along light path 33 result in highly advantageous frequency/wavelength discrimination along light path 33 in a way which has not been seen heretofore and which will be described hereinafter in conjunction with a description of the operation of laser 10.

Now that the basic configuration of laser 10 has been described and still referring to FIGS. 1 and 2, the operation of the laser in accordance with the present invention will be described in detail with regard to a particular implementation. In this implementation, Nd:YVO$_4$ is used as lasant material 24 with 1% Nd dopant concentration and having a 1 mm length along light path 33. The fundamental wavelength is 1064 nm. Operation of this laser is best understood by considering the polarization of the fundamental wavelength during its round-trip travel in cavity 18. First, it is assumed that the fundamental is polarized along the $E_W$ axis of wedge 26 starting from lasant material 24. As the fundamental wave goes through wedge plane 42 on light path 33, it experiences a refraction at the wedge plane which is governed by Snell's law. It then travels through birefrigent member 28 and is retra-reflected back by output mirror 22 along light path 33. Since $E_M$ of birefringent member 28 is at β=45° with respect to the $E_W$ axis of the wedge, the returned fundamental wave will have two polarization components at the fundamental frequency, one along the $E_W$ axis and the other along the $O_W$ axis. The relative amplitude of each component depends on the retardation of birefringent member 28. For example, when member 28 comprises a half-wave or full-wave plate along light path 33, the returned fundamental wave is linearly polarized along the $E_W$ axis of wedge 26 resulting in a particular polarization orientation. On the other hand, when member 28 comprises a quarter-wave plate, the retro-reflected fundamental wave is still linearly polarized, but along the $O_W$ axis of wedge 26 resulting in a different polarization orientation.

As the fundamental wave re-enters wedge 26, because of the difference in the index of refraction along the $O_W$ and $E_W$ axes, the two polarization components will refract differently according to Snell's law and subsequently arrive at different positions on surface 30 of input mirror 20. If input mirror 20 is aligned to retro-reflect the $E_W$ polarized component, the $O_W$ polarized component will be misaligned and rejected outside light path 33 for a 100% loss. Such a rejected path is indicated by the reference number 47 in FIG. 1. Stated in a slightly different way, one polarization of a fundamental wave that experiences a half-wave or full wave retardation through member 28 will experience no change in its polarization as a result of one round-trip through birefringent member 28 while the other polarization will experience a change. With the cooperation of refraction at wedge plane 42 and alignment of input mirror 30, such a fundamental polarization (the unchanged one) then retraces itself along light path 33 so as to experience a minimal loss over one round-trip. It is to be understood that the $O_W$ polarization component may be selected simply by adjusting input mirror 20. Thus, the output polarization of laser 10 may readily be modified to suit a particular application.

Having described the operation of laser 10 with regard to the polarization of the fundamental wavelength, unwanted wavelength modes are now considered which are different than that of the fundamental, but which nonetheless are capable of resonating within cavity 18 in the absence of some sort of frequency discrimination. In this regard, it should be appreciated that birefringent member 28 is normally selected to provide a full or half-wave retardation at a selected fundamental wavelength. Any unwanted (unselected) mode present within cavity 18 will have a wavelength such that the unwanted mode will not experience a half-wave or full-wave retardation through birefringent member 28. Therefore, a round-trip through member 28 will result in polarization changes for these other unwanted modes and differing degrees/directions of refraction upon passing through wedge 26. These modes will, consequently, be reflected by input mirror 30 in such a way that that a component (i.e., a particular polarization) of them will not retrace thereby reducing the overall amplitude of each unwanted mode. Thus, the unwanted modes will be extinguished as a result of substantial cumulative losses which are higher than the gain provided by the lasant material over each round-trip. In other words, one polarization of the unwanted modes will ultimately "walk off" of mirror 20 with sufficient round trip travel while one polarization of one particular frequency may be selected to lase using the frequency selection or filter configuration of the present invention. Therefore, single mode operation is achieved in a cost effective, relatively simple and highly advantageous way.

Referring to FIG. 1, in order to discriminate against unwanted frequencies, wedge angle θ is chosen such that after one round trip, the displacement between polarization components of the fundamental frequency on surface 30, as refracted by birefringent wedge 26, is greater than the diameter of the pump beam waist. This condition can be approximately represented by the expression:

$$\theta > \frac{\omega}{\Delta n_w L}, \qquad (1)$$

where $\Delta n_W$ is the birefringence of wedge 26, L is the length of the laser cavity and ω is the pump beam waist at lasant material 24. For example, θ is calculated for a yttrium orthovanadate wedge using a cavity length of 10 mm, a pump beam waist of 50 μm and $\Delta n_W$=0.21, as being greater than approximately 1.4°. It should be appreciated that larger wedge angles are equally effective. However, from the standpoint of manufacturing costs, the smaller wedge angle advantageously reduces the overall amount of relatively expensive material which is required to form birefringent wedge member 26.

Figure 3:
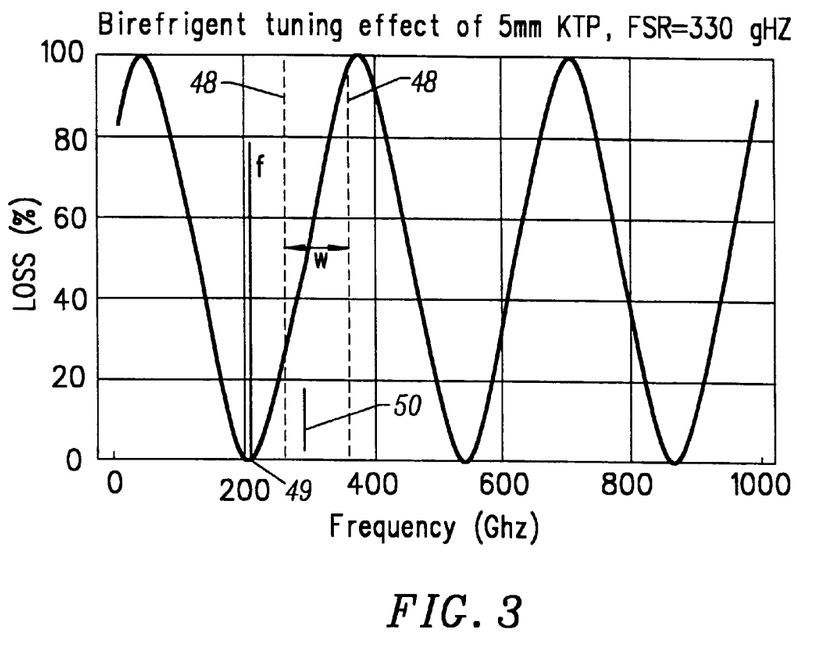
FIG. 3 is a graphical plot illustrating certain aspects of the frequency discrimination configuration of the present invention as to the way in which it provides for SLM operation.

Referring now to FIG. 3, the loss introduced by the frequency filter configuration disclosed herein (the combination of wedge 26 and member 28) can be expressed as:

$$\text{Loss}=\text{Sin}^2(2\beta)\text{Cos}^2(2\pi\Delta n_M L_M v/c), \qquad (2)$$

where $\Delta n_M$ is the birefringence of birefringent member 28, $L_M$ is the length of the birefringent member along light path 33, v is the frequency of the fundamental wave and c is the speed of light. At or near the fundamental wave frequency and for a 5 mm KTP birefringent member length, the percentage loss obtained from equation 2 is plotted against frequency. As can be seen, the percentage loss varies vertically in the figure from zero to 100% over the depicted frequency range for β=45°. The free spectral range (hereinafter FSR) of the frequency filtering configuration of the present invention is determined as:

$$FSR = \frac{c}{2\Delta n_M L_M} \qquad (3)$$

Using the values given above, an FSR of approximately 330 Ghz is obtained for a 5 mm KTP length. The gain bandwidth of Nd:YVO$_4$ is between approximately 250 Ghz to 300 Ghz (~50% gain points) and is shown as "w" in FIG. 3 between dashed lines 48. In order to achieve single mode operation, it is desirable that only one loss mimimum is present within gain bandwidth w of the lasant material. The frequency filtering configuration of the present invention permits a particular loss minimum, for example, the minimum indicated by reference number 49 at a frequency f to be shifted (not shown) to within gain bandwidth range w based upon the frequency spacing between minima as established by the FSR. Shifting loss minimum 49 may be accomplished, for example, by temperature tuning birefringent member 28 or by supporting the member so as to be tiltable against light path 33 using suitable means.

Once loss minimum 49 has been shifted to within gain bandwidth w, its effect is to limit the range of frequencies which may resonate within cavity 18 to a relatively small Δf (not shown) at either side of f. At the same time, the cavity can only support a discrete number of longitudinal modes within its gain bandwidth. For instance, in the case of a 10 mm cavity length which includes 1 mm Nd:YVO$_4$ and 5 mm KTP lengths, the mode spacing between each longitudinal mode is about 11 Ghz. Thus, Δf should be less than 11 Ghz, in the present example, in order to facilitate the selection of a single mode for resonance. With the proper tilt or temperature adjustment applied to member 28, minimum 49 can be shifted to the frequency of a selected mode, the nearest one of which is indicated by reference number 50, such that only one longitudinal mode will experience minimum loss thereby remaining above lasing threshold, as is required for single mode operation. According to equation 1, an adjacent longitudinal mode (11 Ghz away and not shown) will experience a 1.1% loss, the 2nd neighboring mode (22 Ghz away and not shown) will experience a 4.3% loss and the 3rd neighboring mode (33 Ghz away and not shown) will experience a 9.5% loss. Even though the loss for the 1st adjacent mode appears to be small, it is sufficient to limit laser oscillation to an SLM. Additional losses may be provided, for example, by spatial hole-burning and other such known design considerations. In essence, the aforedescribed procedure overlaps the loss minimum of the frequency filtering configuration with the gain peak of the lasant material and also with a selected longitudinal mode of the resonant cavity such that only the selected longitudinal mode will lase, the remaining modes being extinguished due to losses.

Referring to FIGS. 1–3, it was noted earlier that β is preferred to be 45°. The result of changing β is readily understood by considering its influence on the loss curve of FIG. 3 which is plotted for β=45°. At this latter angle, a 100% loss is experienced at the peaks of the curve. As β is reduced towards 0°, the peaks of the curve correspondingly drop due to the sin(2β) term appearing in equation 2 such that unwanted modes experience less loss. At a β of 0°, the curve becomes a straight line at 0% loss such that no frequency discrimination is provided. Therefore, it is evident that a β of 45° is advantageous. As another note, it is to be understood that β defines the relationship between the ordinary and extraordinary axes of birefringent member 28 and wedge 26. The actual directions in which these axes may point can be varied (i.e., rotated about light path 33 in FIG. 2) in an unlimited number of ways so long as their relative directions define a suitable β in accordance with the teachings herein.

Referring to FIG. 1, it should be mentioned that lasant material 24 is placed adjacent input mirror 20. In this way, spatial holeburning will provide additional suppression for neighboring modes. Although it is preferred to place the lasant material close to mirror 20 to take advantage of spatial holeburning for frequency selection, such placement is not a requirement since the frequency filtering configuration of the present invention typically provides for levels of frequency selection which result in single mode operation when configured in accordance with the teachings herein.

As mentioned previously, laser 10 may readily be modified in a way which produces light at a harmonic of any particular fundamental wavelength at which laser 10 lases. More specifically, a non-linear material 51 (indicated as a dashed line) is placed in light path 33. Typically, it is desired to produce light at double the lasing frequency of the fundamental. For example, when the lasant material is Nd:YVO$_4$ and the wavelength of pumping light source 12 is close to 809 nm, the fundamental wavelength is 1064 nm and the second harmonic wavelength is 532 nm in the green. As another example, the Nd:YVO$_4$ has a fundamental wavelength at 916 nm and a second harmonic wavelength at 458 nm in the blue. Thus, depending upon the chosen fundamental wavelength and the specific coating designs of the input mirror on surface 30 and the output mirror on surface 32, the laser can produce either 532 nm in the green or 458 nm in the blue. In the cases of other lasant materials, the fundamental and second harmonic wavelengths may be different as will be appreciated by those of skill in the art.

In one embodiment of a frequency doubled configuration, nonlinear material 51 includes potassium titanate phosphate (KTP) which, in response to fundamental wave input 14, produces second harmonic light 52 indicated by arrows. The mirror on surface 32 of the output mirror may be designed as transparent to light 52 such that the latter passes therethrough, as indicated by arrows 54. It is noted that, in this instance, the output mirror is designed to be totally reflective at the fundamental wavelength such that the small percentage of light which is denoted by arrow 34 in FIG. 1 is not passed through the output mirror. Although the non-linear material is described as KTP, this is not a requirement. The invention equally applies to other nonlinear materials such as, for example, $KN_bO_3$, LBO, BBO, $MgO:LiN_bO_3$, KDP and PPLN.

Figure 4:
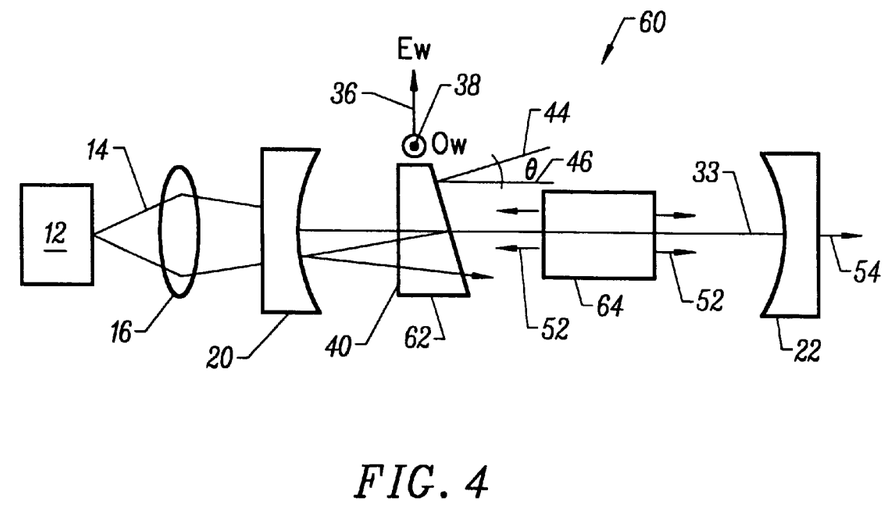
FIG. 4 is a diagrammatic view of another embodiment of a laser manufactured in accordance with the present invention illustrating the use of a birefringent lasant wedge member and a birefringent non-linear member in a harmonically multiplied configuration.

Turning now to FIG. 4, another embodiment of a frequency doubled laser manufactured in accordance with the frequency filtering concept of the present invention is generally indicated by the reference numeral 60. Laser 60 is essentially identical to previously described laser 10 in a frequency doubled configuration with two exceptions. First, lasant material 24 and wedge 26 have been replaced with a birefringent, lasant wedge 62 and, second, birefringent member 28 and non-linear material 51 have been replaced with a birefringent doubling element 64 which is cut for Type II phase matching. For example, if element 64 is formed from KTP, the latter may include a length of 5 mm along light path 33. The KTP is cut for type II phase matching ($\theta=90°$, $\phi=23.5°$) at 1064 nm and its z axis is formed at a 45° angle with respect to the $E_W$ axis of lasant wedge 62 and 90° with respect to line 46 in a manner which is known in the art. Lasant wedge 62 is configured with wedge angle $\theta$ determined by the previously described expression of equation 1. The overall orientation of the ordinary and extraordinary axes of lasant wedge 62 and birefringent doubling element 64 remain unchanged as compared with laser 10 and as shown previously in FIG. 2. For purposes of brevity, these descriptions will not be repeated. Moreover, the operation of laser 60 is essentially identical in spirit with the operation of laser 10 in its doubled frequency configuration. The reader is, therefore, referred to previous descriptions of the operation of system 10. It is noted, however, that laser 60 is advantageous in the sense that it includes fewer components than system 10. One of skill in the art will appreciate that laser 60 includes all the advantages of previously described laser 10 since the frequency filtering configuration of the present invention is employed. In addition, it should also be appreciated that the specific multi-functional components (i.e., lasant wedge 62 and birefringent nonlinear element 64) of system 60 and their arrangement in this implementation have not been seen heretofore.

Figure 5:
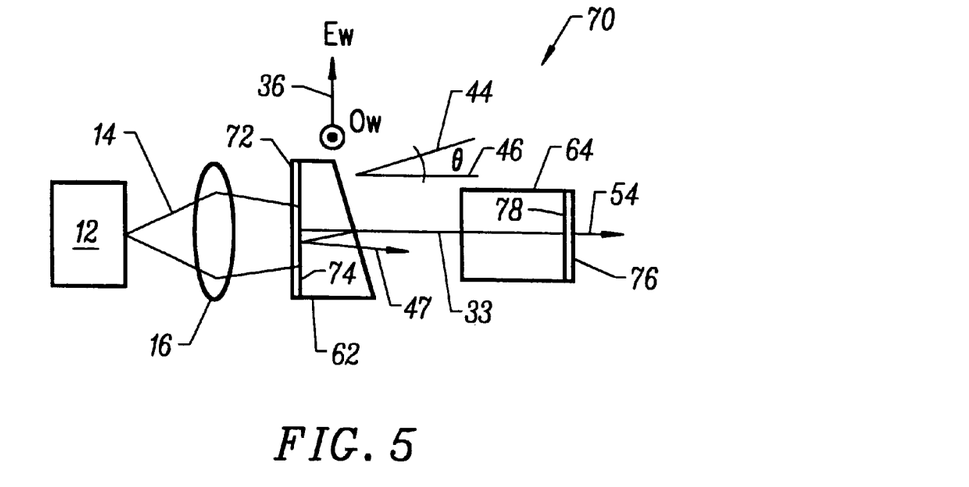
FIG. 5 is a diagrammatic view of still another embodiment of a laser manufactured in accordance with the present invention illustrating the use of mirror coatings on certain components so as to eliminate the need for separate input and output mirrors.

Attention is now directed to FIG. 5 which illustrates still another embodiment of a frequency doubled laser manufactured in accordance with the frequency filtering concept of the present invention and which is generally indicated by the reference numeral 70. Laser 70 is similar to previously described laser 60 except that the need for separate input and output mirrors has been eliminated through the use of an input mirror coating 72 applied to a surface 74 of lasant wedge 62 and an output mirror coating 76 which is applied to a surface 78 of birefringent doubling element 64. Of course, input mirror coating 72 is highly reflective at the fundamental wavelength while output mirror coating 76 is transparent at the doubled frequency as well as being highly reflective at the fundamental frequency such that light 54 passes through the output coating at the second harmonic wavelength. As to its operation and design in accordance with the concepts taught herein, laser 70 is essentially identical to laser 60.

Although the embodiments above have been described with their various components having particular respective orientations, it should be understood that the present invention may take on a wide variety of specific configurations in which various components are located in a wide variety of positions and mutual orientations while still remaining within the scope of the present invention. For example, it is to be understood that any of the frequency doubled configurations disclosed above may readily be converted to SLM laser configurations by removing their nonlinear component and modifying their mirror transmission coatings accordingly. As another example, although the laser of the present invention has been illustrated in the embodiments above as being arranged with its components aligned along a central axis, this is not a requirement, as will be seen immediately hereinafter.

Figure 6:
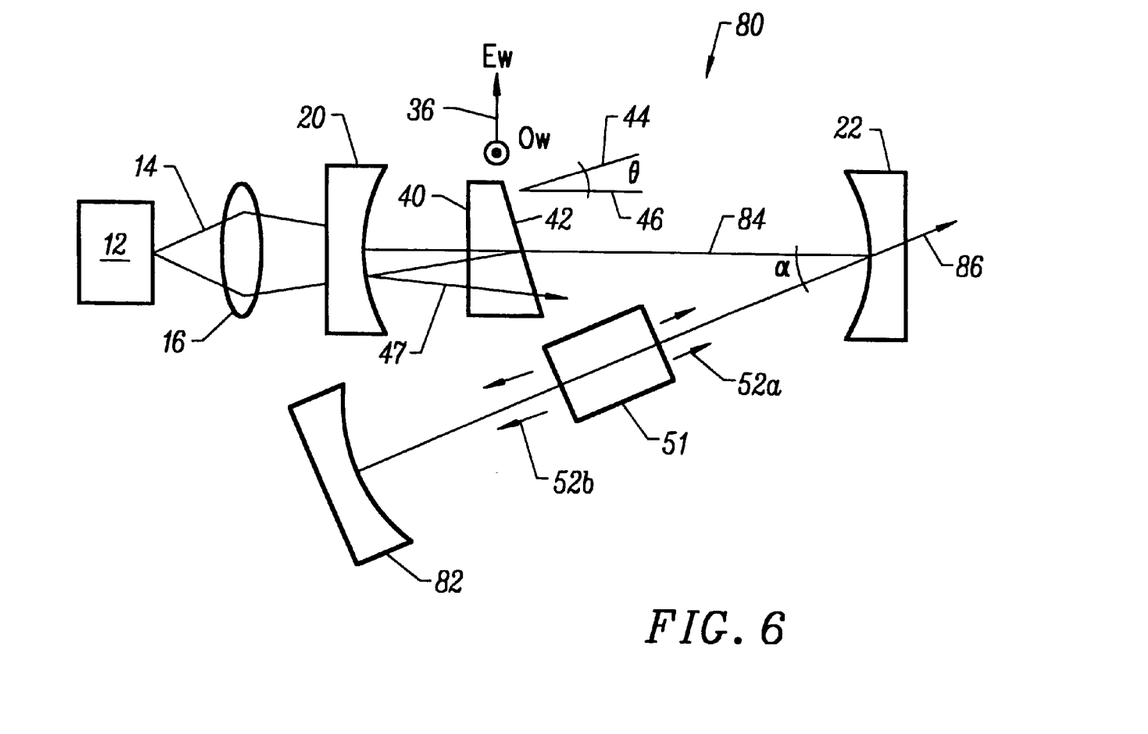
FIG. 6 is a diagrammatic view of yet another embodiment of a laser manufactured in accordance with the present invention shown here to illustrate a harmonically multiplied configuration which provides for outputting harmonic light frequencies which are bi-directionally generated.

Referring to FIG. 6, one frequency doubled, alternative embodiment of a laser manufactured in accordance with the present invention is indicated by the reference numeral 80. In this embodiment, a third mirror 82 is added which is coated to be highly reflective at both the fundamental and second harmonic wavelengths, 1064 nm and 532 nm, respectively. A light path 84 is defined within the cavity of laser 80 which includes an acute angle $\alpha$. It should be appreciated that non-linear material 51 produces one portion 52a of doubled frequency light in response to the fundamental wavelength in one direction and produces another portion 52b of doubled frequency light in response to the fundamental wavelength in the opposite direction. In this configuration, mirror 82 advantageously reflects light portion 52b back toward output mirror 22 such that the forward and backward second harmonic light radiation with the same phase are combined and output as light 86 from the output mirror. The optical path of laser 80 may include a shape other than shown such as, for example, an "L" shape or any other suitable shape. In one variation, mirror 82 may be replaced with a highly reflective coating (not shown) on a surface 88 of non-linear member 51.

As compared with the prior art, the frequency discrimination configuration and associated method of the present invention are highly advantageous in a number of different ways. For example, the use of a Brewster plate is avoided. As described above, the birefringent wedge or lasant wedge member of the present invention can be fabricated using a minimal amount of material since $\theta$ can be held to a value which is dramatically less than the typical 45° angle required in a Brewster plate. The exact value of $\theta$ is also not critical as long as it is greater than the predetermined value established by equation (1). Moreover, this advantage may in and by itself result in an overall assembly which is more compact. As another example, the light output of the present invention is polarization selective at a fundamental wavelength in an SLM laser configuration or at a harmonic wavelength in a frequency multiplied configuration. That is, the output polarization may readily be modified in accordance with the foregoing teachings.

It is noted that all intracavity optical surfaces are preferred to be inclined at a small angle off normal to the cavity axis so as to minimize coupled cavity and intracavity etalon effects.

In that the laser assemblies disclosed herein may be provided in a variety of different configurations and produced using a number of different methods, it should be understood that the present invention may be embodied in many other specific forms without departing from the spirit or scope of the invention. Therefore, the present examples and methods are to be considered as illustrative and not restrictive, and the invention is not to be limited to the details given herein, but may be modified within the scope of the appended claims.

What is claimed is:

1. A laser comprising:
   a) an input mirror and an output mirror defining a resonant cavity and a light path within the resonant cavity and between the mirrors;
   b) a lasant material positioned in said light path for lasing at a desired fundamental wavelength and possibly other, unwanted wavelengths;
   c) first birefringent means including a configuration which defines a pair of non-parallel surfaces positioned in said light path for refracting in different directions the different wavelengths of light which are present along said path; and
   d) second birefringent means positioned in said light path and cooperating with said first birefringent means such that the first and second birefringent means together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of said unwanted wavelengths to be extinguished.

2. A laser comprising:
   a) an input mirror and an output mirror defining a resonant cavity and a light path within the resonant cavity and between the mirrors;
   b) a lasant material positioned in said light path for lasing at a desired fundamental wavelength and possibly other, unwanted wavelengths;
   c) first birefringent means positioned in said light path for refracting in different directions the different wavelengths of light which are present along said path, said first birefringent means being formed in the shape of a wedge member including one surface which is substantially normal to said light path and a wedge plane surface which is at an acute angle with respect to said one surface such that the wedge plane surface is at a skewed angle with respect to said light path; and
   d) second birefringent means positioned in said light path and cooperating with said first birefringent means such that the first and second birefringent means together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of said unwanted wavelengths to be extinguished.

3. The laser of claim 2 wherein said wedge shaped birefringent member includes an ordinary axis and an extraordinary axis which are orthogonal with respect to one another and which define a plane such that said light path is substantially normal thereto.

4. The laser of claim 2 wherein a direction which is normal to the wedge plane surface of said birefringent wedge member forms said skewed angle with the light path which angle is greater than $$\frac{\omega}{\Delta n_w L},$$

where $\Delta n_W$ is the birefringence of the birefringent wedge member, L is the length of the laser cavity and $\omega$ is a beam waist of the fundamental at the lasant material.

5. A laser comprising:
   a) an input mirror and an output mirror defining a resonant cavity and a light path within the resonant cavity and between the mirrors;
   b) a lasant material positioned in said light path for lasing at a desired fundamental wavelength and possibly other, unwanted wavelengths;
   c) first birefringent means positioned in said light path for refracting in different directions the different wavelengths of light which are present along said path;
   d) second birefringent means positioned in said light path and cooperating with said first birefringent means such that the first and second birefringent means together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of said unwanted wavelengths to be extinguished; and
   e) a non-linear material positioned in said light path for receiving light initially produced at said fundamental wavelength by said lasant material and for generating light at a particular harmonic of said fundamental wavelength.

6. The laser of claim 5 including a single element which serves as both said second birefringent means and as said non-linear material.

7. The laser of claim 1 wherein said first and second birefringent means include respective ordinary and extraordinary axes and wherein the ordinary and extraordinary axes of the first birefringent means are arranged in a particular orientation with respect to the ordinary and extraordinary axes of the second birefringent means along said light path such that only a selected polarization of the fundamental frequency lases.

8. The laser of claim 7 wherein the ordinary and extraordinary axes of the first birefringent means are non-parallel with respect to the ordinary and extraordinary axes of the second birefringent means along said light path.

9. The laser of claim 1 wherein said second birefringent means serves as a wave plate including a thickness along said light path which at least in part establishes said fundamental wavelength.

10. The laser of claim 9 wherein said thickness is such that said second birefrigent means is a full waveplate at said fundamental wavelength.

11. A laser comprising:
    a) an input mirror and an output mirror defining a resonant cavity and a light path within the resonant cavity and between the mirrors;
    b) a lasant material positioned in said light path for lasing at a desired fundamental wavelength and possibly other, unwanted wavelengths;
    c) first birefringent means positioned in said light path for refracting in different directions the different wavelengths of light which are present along said path; and d) second birefringent means positioned in said light path and cooperating with said first birefringent means such that the first and second birefringent means together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of said unwanted wavelengths to be extinguished, said second birefringent means also serving as a nonlinear material such that light at said desired fundamental wavelength passing through the second birefringent means causes the latter to generate a particular harmonic of said fundamental wavelength.

12. The laser of claim 11 wherein said second birefringent means is cut for Type II phase matching.

13. The laser of claim 11 wherein said second birefringent means is KTP.

14. A method of producing light at essentially a single wavelength, said method comprising the steps of:
  a) providing an input mirror and an output mirror defining a resonant cavity and a light path therebetween;
  b) positioning a lasant material in said resonant cavity along said light path;
  c) exposing said lasant material to a light source such that it produces light;
  d) passing said light through a specifically configured birefringent means configured to define a pair of non-parallel surfaces such that the polarization of a component of said light at a desired, single wavelength is affected in a predetermined way and so that certain polarizations of all of the other components of said light at other wavelengths are affected in other ways; and
  e) refracting said light such that said certain polarizations of light are refracted at angles which cause all polarizations of the other wavelengths to be rejected and so that one polarization of said single wavelength is refracted at an angle which causes the single wavelength to retrace itself and thereby lase within said cavity.

15. The method of claim 14 wherein said component of said single wavelength is affected in said predetermined way by remaining unchanged in polarization after passing through said specifically configured birefringent means and so that said certain polarizations of all of the other components of said light are affected in said other ways by changing in polarization after passing through said birefringent means.

16. A laser comprising:
  a) an input mirror and an output mirror defining a resonant cavity and a light path within the resonant cavity and between the mirrors;
  b) a lasant material positioned in said light path for lasing at a desired fundamental wavelength and possibly other, unwanted wavelengths, said lasant material being birefringent and being configured for refracting said desired fundamental wavelength and said unwanted wavelengths of light which may be present along said path in different directions; and
  c) a birefringent element positioned in said light path such that the birefringent lasant material and the birefringent element together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of the unwanted wavelengths to be extinguished.

17. The laser of claim 16 wherein said lasant material includes an ordinary axis and an extraordinary axis which are orthogonal with respect to one another and which define a plane such that said light path is substantially normal thereto.

18. A laser comprising:
  a) an input mirror and an output mirror defining a resonant cavity and a light path within the resonant cavity and between the mirrors;
  b) a lasant material positioned in said light path for lasing at a desired fundamental wavelength and possibly other, unwanted wavelengths, said lasant material being birefringent and being configured for refracting said desired fundamental wavelength and said unwanted wavelengths of light which may be present along said path in different directions, said lasant material being formed in the shape of a wedge including one surface which is substantially normal to said light path and a wedge plane surface which is at an acute angle with respect to said one surface such that the wedge plane surface is at a skewed angle with respect to said light path; and
  c) a birefringent element positioned in said light path such that the birefringent lasant material and the birefringent element together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of the unwanted wavelengths to be extinguished.

19. The laser of claim 18 wherein a direction which is normal to the wedge plane surface of said lasant material forms said skewed angle with the light path which angle is greater than $$\frac{\omega}{\Delta n_w L},$$

where $\Delta n_W$ is the birefringence of the lasant material, L is the length of the laser cavity and $\omega$ is a beam waist of the fundamental at the lasant material.

20. A laser comprising:
  a) an input mirror and an output mirror defining a resonant cavity and a light path within the resonant cavity and between the mirrors;
  b) a lasant material positioned in said light path for lasing at a desired fundamental wavelength and possibly other, unwanted wavelengths, said lasant material being birefringent and being configured for refracting said desired fundamental wavelength and said unwanted wavelengths of light which may be present along said path in different directions;
  c) a birefringent element positioned in said light path such that the birefringent lasant material and the birefringent element together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of the unwanted wavelengths to be extinguished; and d) a non-linear material positioned in said light path for receiving light initially produced at said fundamental wavelength by said lasant material and for generating light at a particular harmonic of said fundamental wavelength.

21. The laser of claim 20 including a single element which serves as both said birefringent element and as said non-linear material.

22. The laser of claim 16 wherein said lasant material and said birefringent element include respective ordinary and extraordinary axes and wherein the ordinary and extraordinary axes of lasant material are arranged in a particular orientation with respect to the ordinary and extraordinary axes of the birefringent element along said light path such that only a selected polarization of the fundamental frequency lases.

23. The laser of claim 22 wherein the ordinary and extraordinary axes of the lasant material are non-parallel with respect to the ordinary and extraordinary axes of the birefringent element along said light path.

24. The laser of claim 16 wherein said birefringent element serves as a wave plate including a thickness along said light path which at least in part establishes said fundamental wavelength.

25. The laser of claim 24 wherein said thickness is such that said birefrigent element is a full waveplate at said fundamental wavelength.

26. A laser comprising:

a) an input mirror and an output mirror defining a resonant cavity and a light path within the resonant cavity and between the mirrors;

b) a lasant material positioned in said light path for lasing at a desired fundamental wavelength and possibly other, unwanted wavelengths, said lasant material being birefringent and being configured for refracting said desired fundamental wavelength and said unwanted wavelengths of light which may be present along said path in different directions; and c) a birefringent element positioned in said light path such that the birefringent lasant material and the birefringent element together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of the unwanted wavelengths to be extinguished, said birefringent element further serving as a non-linear material such that light at said fundamental wavelength passes through said birefringent element to cause the birefringent element to generate a particular harmonic of said fundamental wavelength.

27. The laser of claim 26 wherein said birefringent element is cut for Type II phase matching.

28. The laser of claim 26 wherein said birefringent element is KTP.

29. The laser of claim 16 wherein said mirrors are applied in the form of coatings to predetermined surfaces of said lasant material and said birefringent element so as to define the resonant cavity.

30. A method of doubling the frequency of a particular frequency of light, said method comprising the steps of:

a) providing an input mirror and an output mirror defining a resonant cavity and a light path therebetween;

b) positioning a lasant material in said resonant cavity along said light path;

c) exposing said lasant material to a light source such that it produces light;

d) passing said light through a specifically configured birefringent means such that the polarization of a component of said light at a desired, single wavelength is affected in a predetermined way and so that certain polarizations of all of the other components of said light at other wavelengths are affected in other ways;

e) refracting said light such that said certain polarizations of light are refracted at angles which cause the other wavelengths to be rejected and so that said component of said single wavelength is refracted at an angle which causes the single wavelength to retrace itself and thereby lase within said cavity; and f) positioning a non-linear material along said path such that light is generated at a frequency that is twice that of said particular frequency.

31. The method of claim 30 wherein said component of said single wavelength is affected in said predetermined way by remaining unchanged in polarization and such that said certain polarizations of all of the other components of said light are affected in said other ways by changing in polarization.

32. A laser comprising:

a) an input mirror and an output mirror defining a resonant cavity and a light path within the resonant cavity and between the mirrors;

b) a single member positioned in said light path for lasing at a desired fundamental wavelength and possibly other, unwanted wavelengths and for birefringently refracting in different directions the different wavelengths of light which are present along said path; and c) birefringent means positioned in said light path and cooperating with said member such that the member and the birefringent means together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of said unwanted wavelengths to be extinguished.

33. A laser comprising:

a) an input mirror and an output mirror defining a resonant cavity and a light path within the resonant cavity and between the mirrors;

b) a lasant material positioned in said light path for lasing at a desired fundamental wavelength and possibly other, unwanted wavelengths;

c) first birefringent means including ordinary and extraordinary axes and being positioned in said light path for refracting in different directions the different wavelengths of light which are present along said path; and d) second birefringent means including ordinary and extraordinary axes and being positioned in said light path to cooperate with said first birefringent means by having the ordinary and extraordinary axes of the first birefringent means arranged at 45° with respect to the ordinary and extraordinary axes of the second birefringent means along said light path such that only a selected polarization of the fundamental frequency lases and the first and second birefringent means together discriminate against the unwanted wavelengths so that certain portions of the unwanted wavelengths are refracted in other directions which cause all other polarizations of said unwanted wavelengths to be extinguished.

34. A laser comprising:
a) an input mirror and an output mirror defining a resonant cavity and a light path within the resonant cavity and between the mirrors;
b) a lasant material positioned in said light path for lasing at a desired fundamental wavelength and possibly other, unwanted wavelengths;
c) first birefringent means positioned in said light path for refracting in different directions the different wavelengths of light which are present along said path; and
d) second birefringent means positioned in said light path and cooperating with said first birefringent means such that the first and second birefringent means together discriminate between the desired fundamental wavelength and the unwanted wavelengths so that one polarization of said desired fundamental wavelength is refracted in one direction which causes it to lase while certain portions of the unwanted wavelengths are refracted in other directions which cause all polarizations of said unwanted wavelengths to be extinguished, said second birefringent means including a thickness which causes the second birefringent means to serve as a one-half wave plate at said fundamental wavelength along said light path which at least in part establishes said fundamental wavelength.

35. A laser comprising:
a) an input mirror and an output mirror defining a resonant cavity and a light path within the resonant cavity and between the mirrors;
b) a lasant material including ordinary and extraordinary axes and being positioned in said light path for lasing at a desired fundamental wavelength and possibly other, unwanted wavelengths, said lasant material being birefringent and being configured for refracting said desired fundamental wavelength and said unwanted wavelengths of light which may be present along said path in different directions; and c) a birefringent element including ordinary and extraordinary axes and being positioned in said light path such that the ordinary and extraordinary axes of the lasant material are arranged at 45° with respect to the ordinary and extraordinary axes of the birefringent element and so that said birefringent lasant material and said birefringent element together discriminate between the desired fundamental wavelength and the unwanted wavelengths causing a selected polarization of said desired fundamental wavelength to be refracted in one direction which causes it to lase while certain other portions of the unwanted wavelengths are refracted in other directions which cause all other polarizations of the unwanted wavelengths to be extinguished.

36. A laser comprising:
a) an input mirror and an output mirror defining a resonant cavity and a light path within the resonant cavity and between the mirrors;
b) a lasant material positioned in said light path for lasing at a desired fundamental wavelength and possibly other, unwanted wavelengths, said lasant material being birefringent and being configured for refracting said desired fundamental wavelength and said unwanted wavelengths of light which may be present along said path in different directions; and
c) a birefringent element positioned in said light path such that the birefringent lasant material and the birefringent element together discriminate between the desired fundamental wavelength and the unwanted wavelengths, said birefringent element having a thickness along said light path which causes it to serve as a one-half wave plate which at least in part establishes said fundamental wavelength so that one polarization of said desired fundamental wavelength is refracted in one direction which causes it to lase while certain portions of the unwanted wavelengths are refracted in other directions which cause all polarizations of the unwanted wavelengths to be extinguished.

* * * * *